Figure 1:
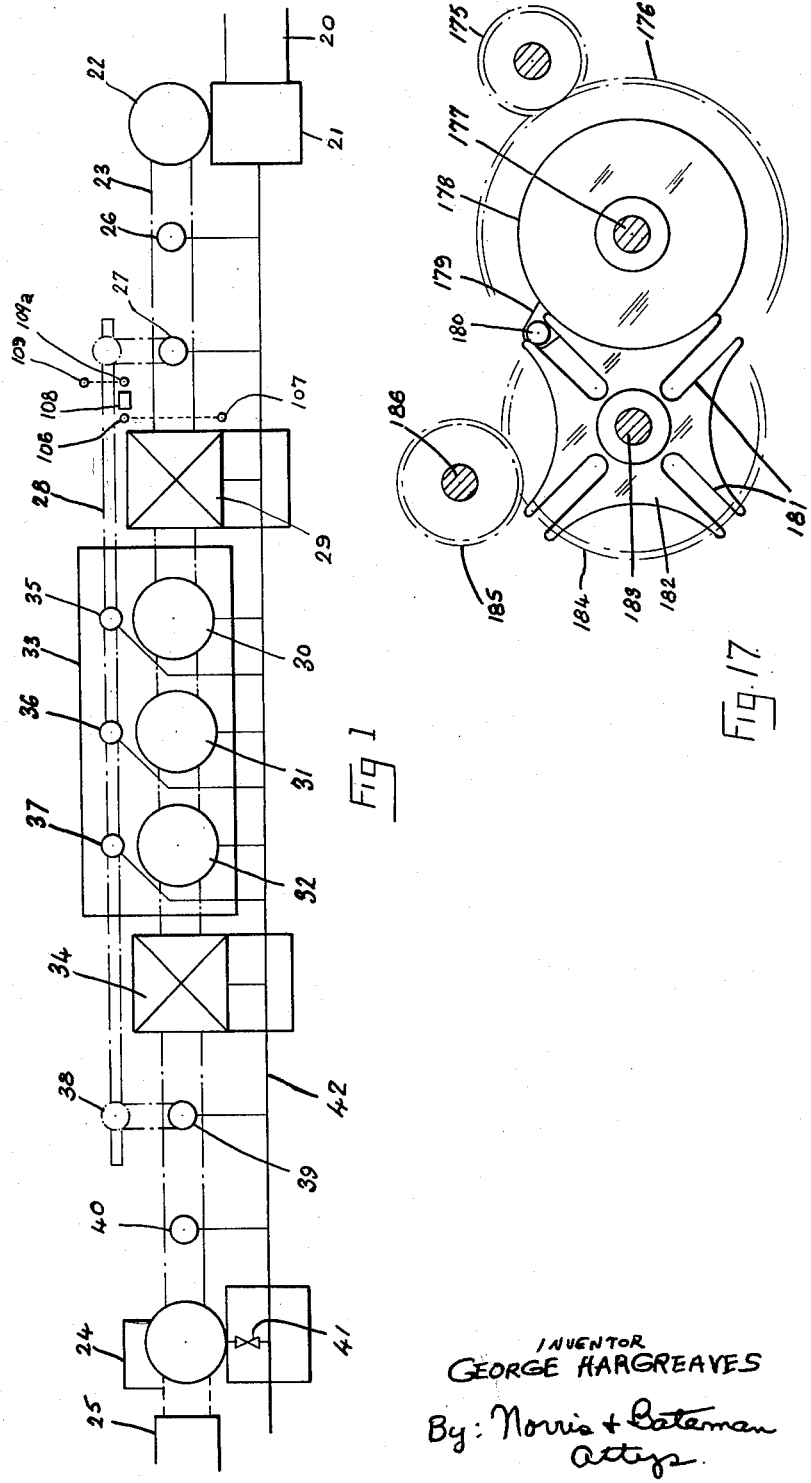

April 27, 1965 G. HARGREAVES 3,180,344
APPARATUS FOR HANDLING AND WASHING BARRELS, KEGS AND THE LIKE
Filed May 31, 1962 10 Sheets-Sheet 1

INVENTOR
GEORGE HARGREAVES
By: Norris + Bateman
attys.

April 27, 1965  G. HARGREAVES  3,180,344
APPARATUS FOR HANDLING AND WASHING BARRELS, KEGS AND THE LIKE
Filed May 31, 1962  10 Sheets-Sheet 2

INVENTOR
GEORGE HARGREAVES
By Norris + Bateman
attys.

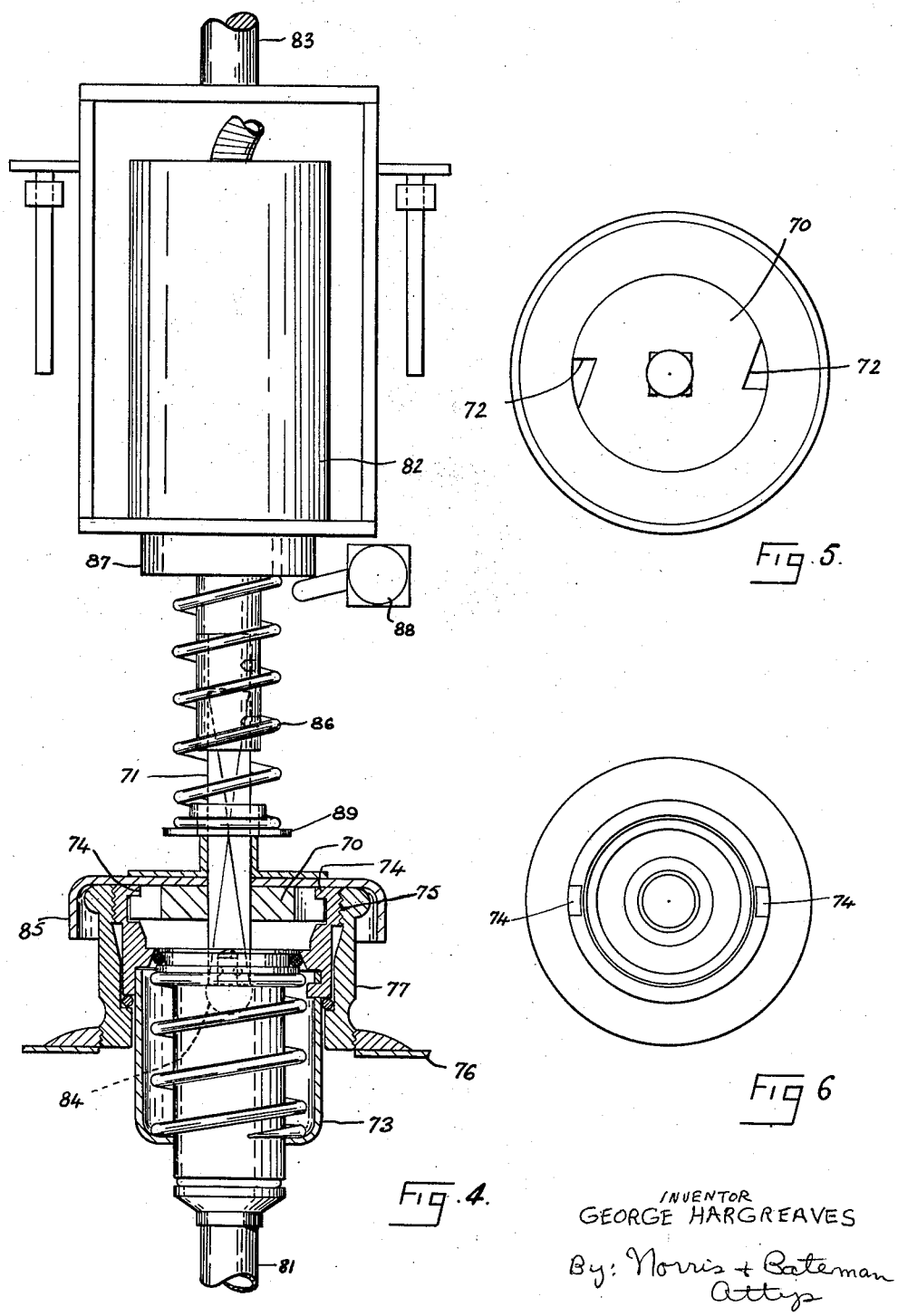

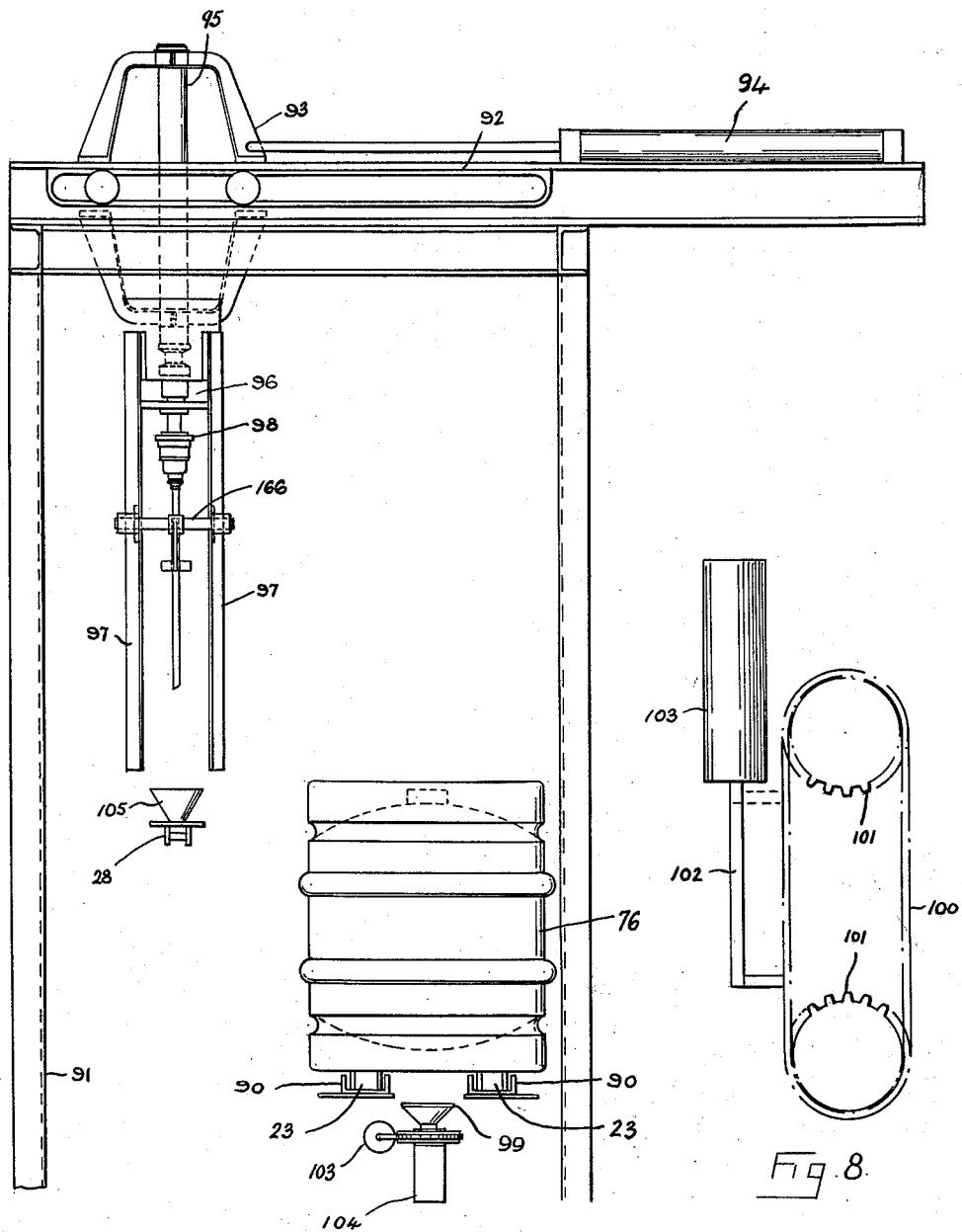

April 27, 1965 G. HARGREAVES 3,180,344
APPARATUS FOR HANDLING AND WASHING BARRELS, KEGS AND THE LIKE
Filed May 31, 1962 10 Sheets-Sheet 8

INVENTOR
GEORGE HARGREAVES
By: Norris & Bateman
Attys.

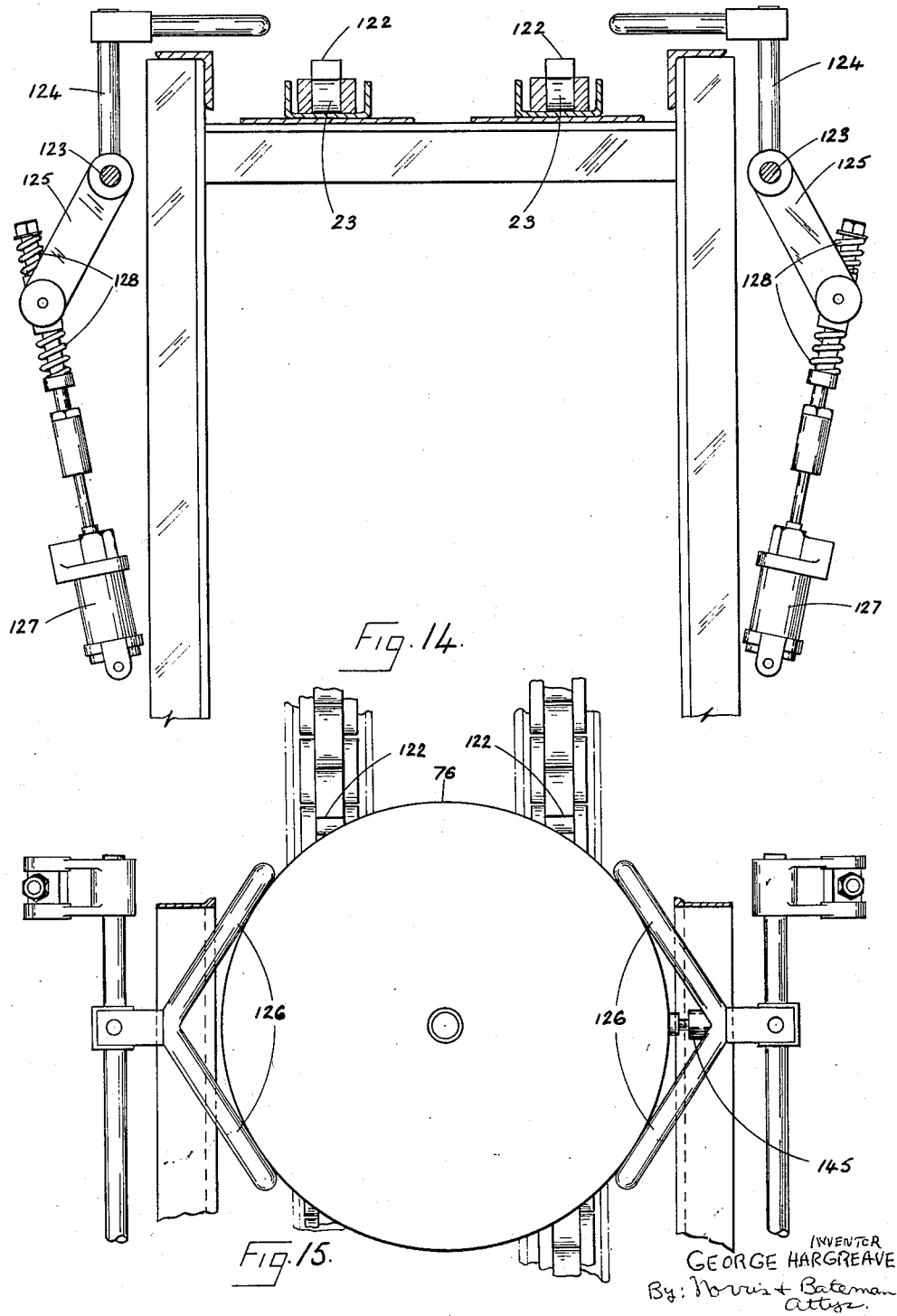

INVENTOR
GEORGE HARGREAVES
By: Norris + Bateman
Attys

3,180,344
APPARATUS FOR HANDLING AND WASHING BARRELS, KEGS AND THE LIKE
George Hargreaves, Blackburn, England, assignor to Wright Hargreaves Engineering Company Limited, Blackburn, England, a British company
Filed May 31, 1962, Ser. No. 198,874
Claims priority, application Great Britain, June 1, 1961, 19,805/61; Aug. 2, 1961, 28,001; Oct. 16, 1961, 36,969/61; Nov. 9, 1961, 40,124
11 Claims. (Cl. 134—62)

Metal barrels or casks are being increasingly used for beer and other liquids, and as such casks usually have screwed bungs, or screwed bungs incorporating pressure relief valves, the procedure for handling and washing of the casks must be modified to provide for the removal of such screwed bungs, cleaning of the bungs, and replacement in the washed casks.

The present invention is designed to provide apparatus for handling and washing barrels, casks or the like which have screwed bungs or the like.

Another object is to provide apparatus comprising means for transporting casks in succession to a first station, then in step by step fashion through at least one washing station and a final station, means being provided at the first station for unscrewing and removing screwed bungs from the casks, and means being provided at the final station for re-fitting the screwed bungs to the casks. The term screwed bungs is intended to include valves and similar devices, as well as simple closure members, adapted to be mounted in a wall of a cask by means of screw threads.

A further object is to provide means for loading casks on to a first station of the washing apparatus with the screwed bungs uppermost, and to provide means at a second station for inverting said casks prior to washing, and to provide means for re-inverting the casks at a station between the washing station and the final station.

A still further object is to provide means for washing screwed bungs that have been removed from casks prior to washing of the casks and deliver said screwed bungs after washing to a bung replacing station of the cask washing apparatus.

The means for unscrewing and for tightening the screwed bungs may comprise the devices that are well known as "nut runners" and are used in many engineering assembly workshops for such operations as fitting nuts to screwed studs. These nut runners may be driven electrically or in any other convenient manner, but in the present apparatus it is preferred that they should be pneumatically operated.

Figure 2:
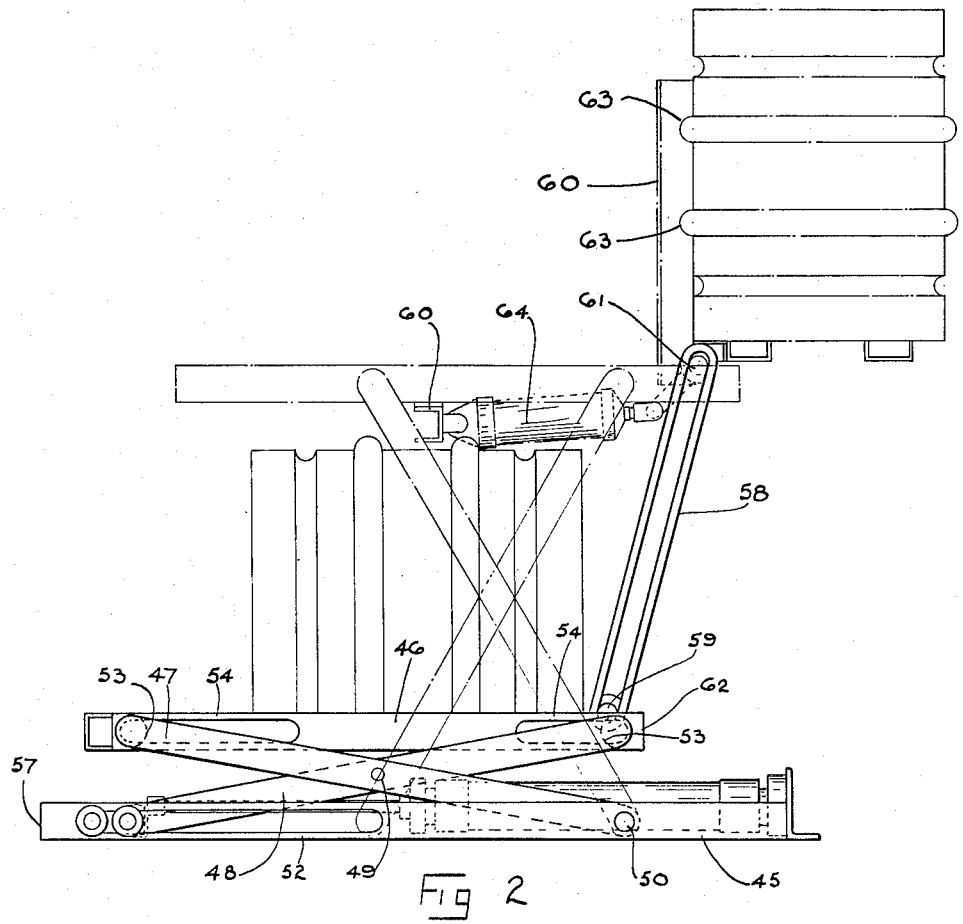
Figure 3:
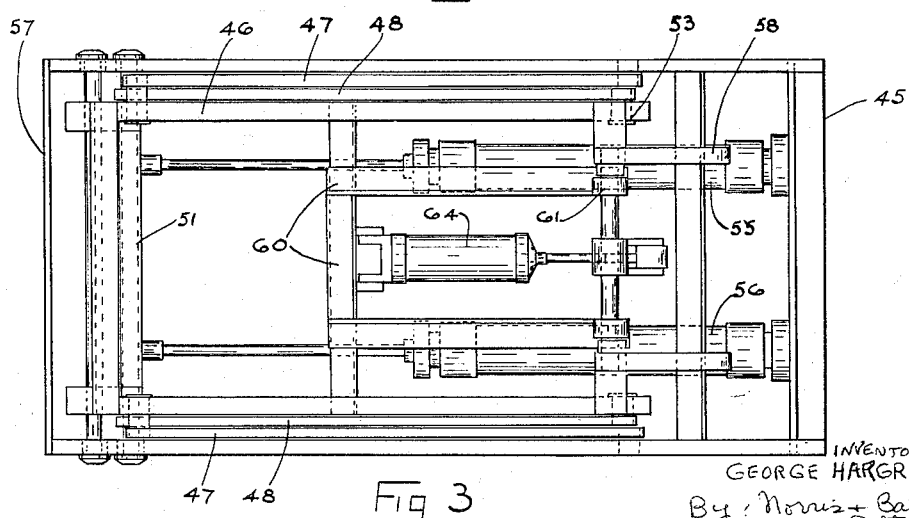
Figure 9:
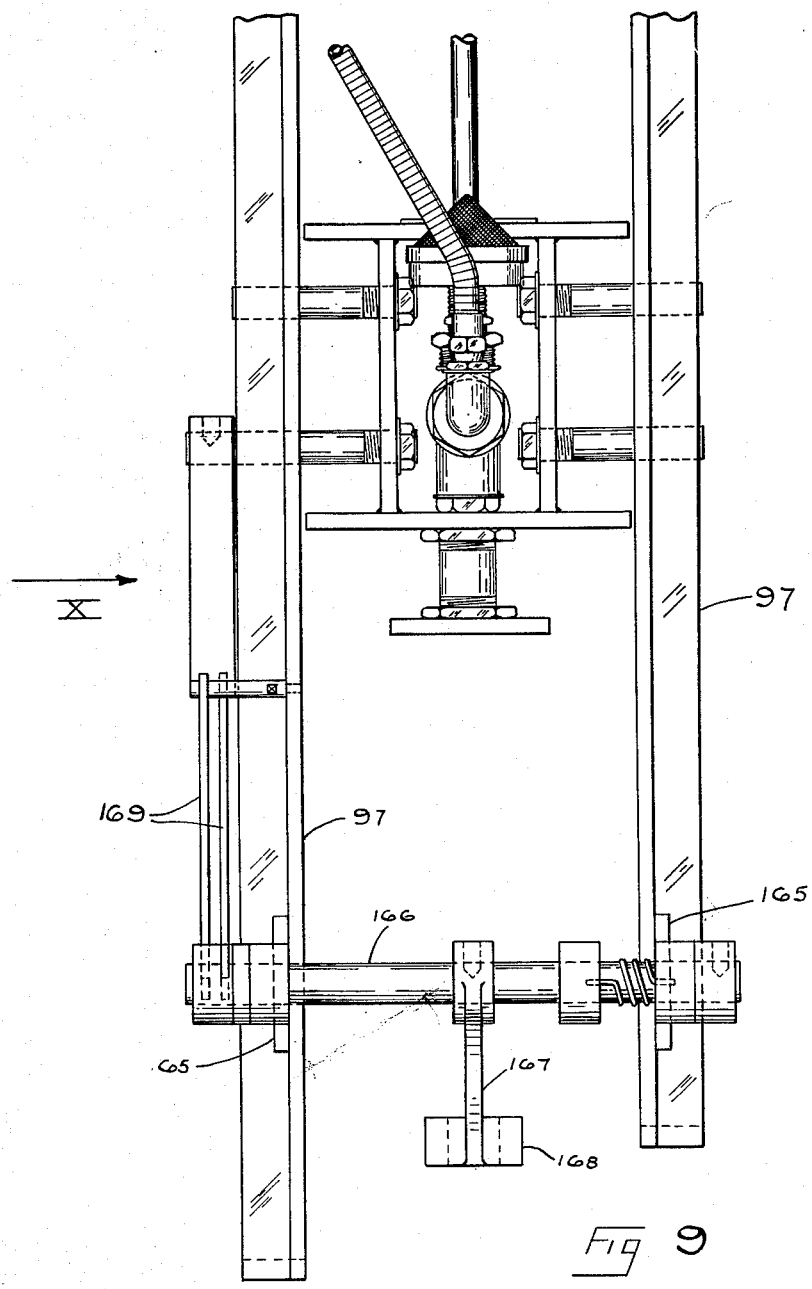
Figure 10:
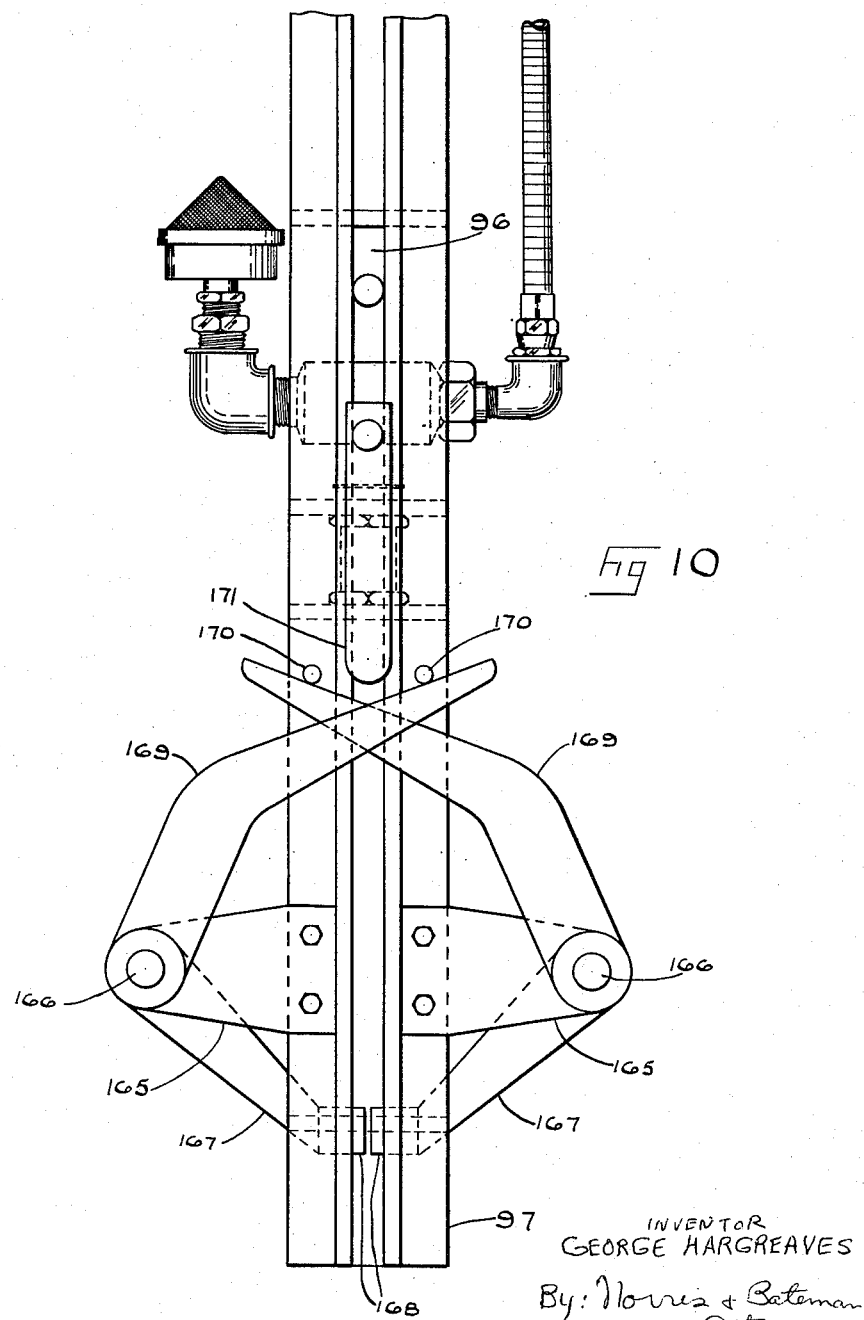
Figure 11:
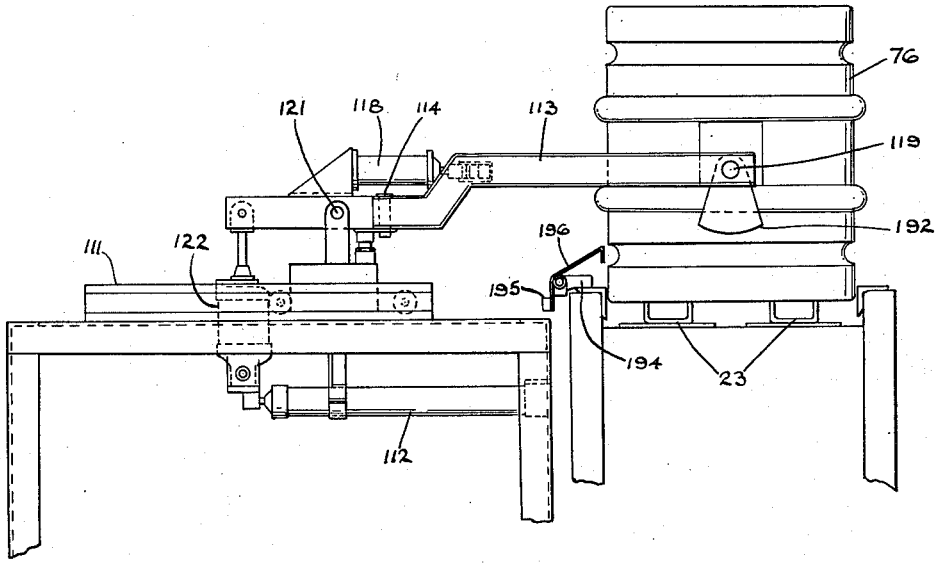
Figure 12:
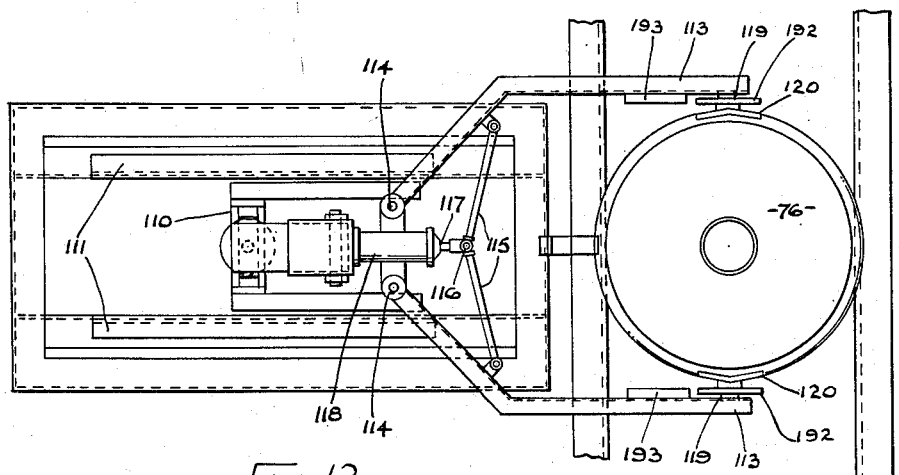
Figure 13:
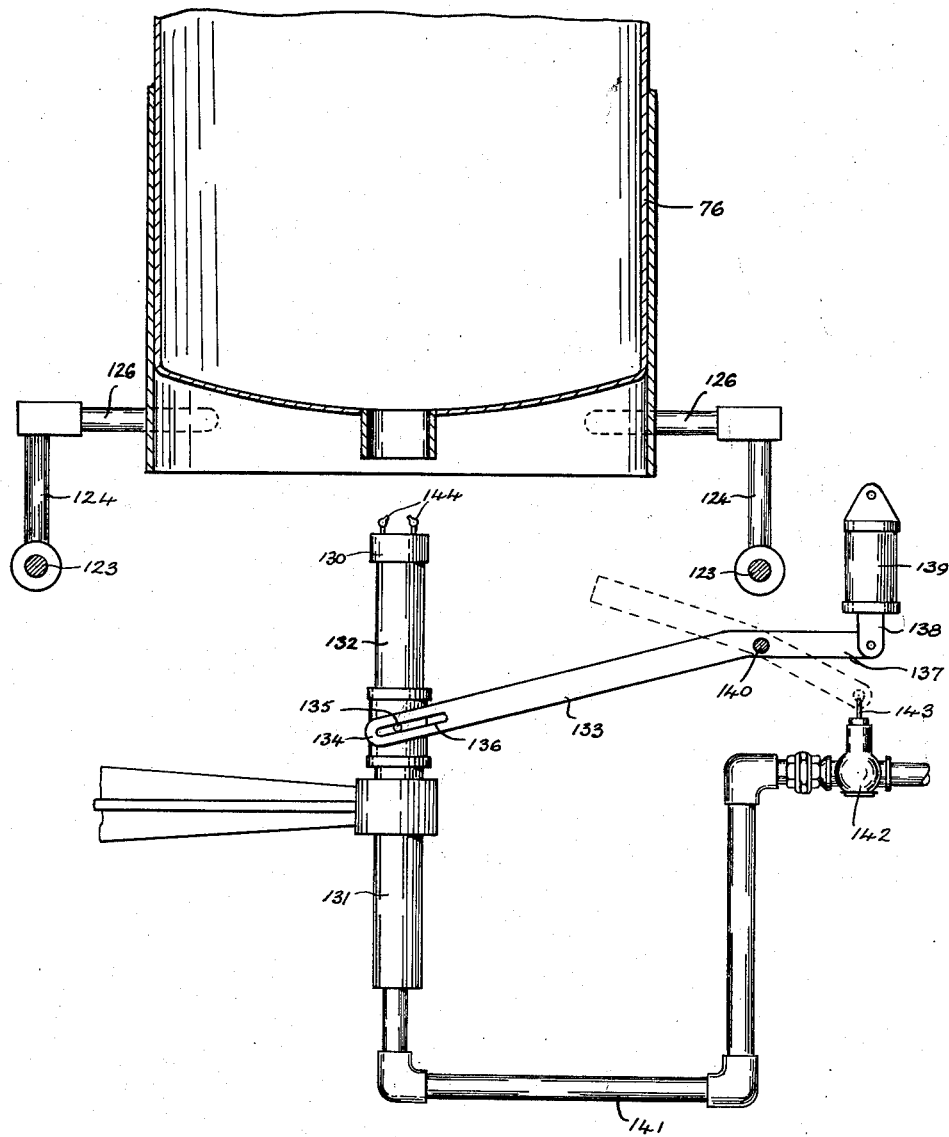
Figure 16:
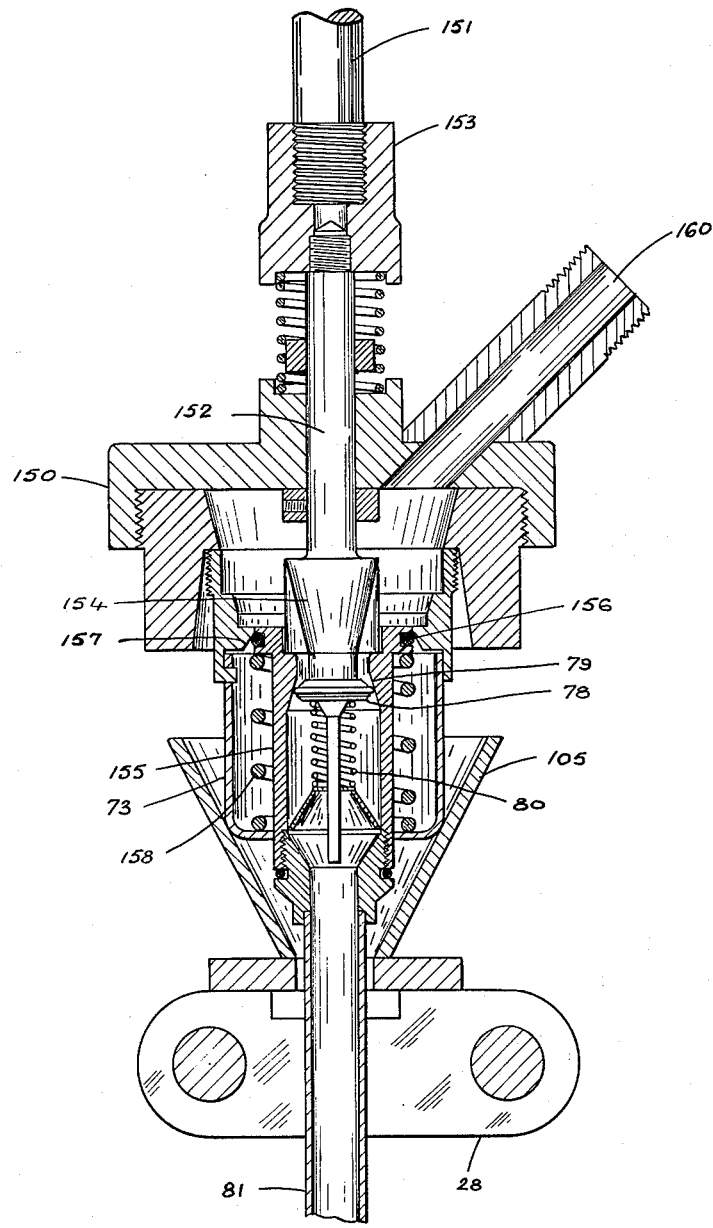

One particular arrangement of apparatus for handling and washing beer barrels, will now be described by way of example only, with reference to the accompanying drawings, in which:

FIGURE 1 is a diagrammatic plan view showing the general layout of the cask washing apparatus, FIGURE 2 is a side elevation of apparatus for loading casks on to the cask washing apparatus, FIGURE 3 is a plan view of the cask loading apparatus of FIGURE 2, FIGURE 4 is a side elevation of bung unscrewing mechanism for the cask washing apparatus, FIGURE 5 is a section on the line V—V of FIGURE 4, FIGURE 6 is a plan view of the bung hole portion of a cask, FIGURE 7 is an elevation of the mechanism at the bung removing and transporting station of the apparatus of FIGURE 1, FIGURE 8 is a diagrammatic plan view of mechanism for imparting rotation to a cask at the said bung removing and transporting station, FIGURE 9 is a detail view of bung removing mechanism, FIGURE 10 is a detail view in the direction of the arrow X of FIGURE 9, FIGURE 11 is a side elevation of cask inverting mechanism incorporated in the cask washing apparatus, FIGURE 12 is a plan view of the mechanism shown in FIGURE 11, FIGURE 13 is an elevation showing the washing nozzle and associated mechanism at a washing station of the apparatus of FIGURE 1, FIGURE 14 is an elevation showing mechanism for centralizing a cask at the washing station, FIGURE 15 is a plan view of the mechanism of FIGURE 13, FIGURE 16 is a detail elevation of the mechanism for washing a screwed bung, and FIGURE 17 is a diagrammatic view of mechanism for driving the conveyor in step-by-step fashion.

Referring to FIGURE 1 of the drawings, 20 indicates a chute down which casks are fed to a loading device at 21 which is arranged to lift a cask and tip it on one end the end opposite the bung end, on to a conveyor at a receiving station 22. The conveyor is indicated at 23 and is adapted to carry a succession of casks in step-by-step fashion through a series of stations with a dwell period at each station and finally to a discharge station 24 from where the casks are fed on to a discharge conveyor 25 which carries the casks away from the washing apparatus either to a cask filling apparatus or to store. The said series of stations are as follows. After the receiving station 22 a cask is conveyed to a bung unscrewing station 26 where the screwed bung is unscrewed but left resting over the cask bung hole. At the next station 27, means are provided for removing the screwed bung from the cask and for transferring the screwed bung to a bung conveyor 28 which is disposed parallel with the conveyor 23 and is adapted to carry screwed bungs in step-by-step fashion through at least one bung washing station, the step-by-step movements of the conveyor 28 being synchronised with the movements of the conveyor 23. After the station 27, the conveyor 23 carries the cask to a cask inverting station 29, so as to dispose the cask on the conveyor with its end having the bung hole lowermost. The cask is then carried to a series of washing stations, three such washing stations being indicated at 30, 31 and 32, although there may be more or fewer than three washing stations according to requirements. During the dwell period at each washing station, a nozzle is inserted upwardly through the cask bung hole to direct a jet or stream of washing water into the interior of the cask, the nozzle being withdrawn just before the end of the dwell period. A tank indicated at 33 is disposed beneath the conveyor at the washing stations to receive washing water which flows out of the cask bung holes. After the washing stations, the conveyor carries the cask to a second inverting station 34 which is similar to the inverting station 29 and serves to return the barrel to its original position on the conveyor with its bung hole uppermost ready to receive its screwed bung.

The conveyor 28 carries the screwed bungs in step-by-step fashion through bung washing stations 35, 36 and 37, aligned with the cask washing stations 30, 31 and 32, and as with the cask washing stations, there may be more or fewer than three bung washing stations according to requirements. The bung washing stations are also disposed above the tank 33 so that the water used for washing the bungs will fall into the tank. From the washing stations, the screwed bung will be carried to a bung discharge station 38 which is aligned with a bung replacing station 39 to which the cask is carried by the conveyor 23 from the cask washing stations. Means are provided for transferring the screwed bung from the station 38 to the replacing station 39 where the screwed bung is placed in position in the cask bung hole. The cask is then carried by the conveyor 23 to a bung tightening station 40 where means are provided for tightening the screwed bung in the cask bung hole. Finally, the conveyor carries the cask to the discharge station 24 for transfer to the discharge conveyor 25.

In this particular apparatus, the various operations at the several stations are effected by pneumatically operated means controlled by valve mechanism that is actuated by cam mechanism operatively connected with the driving mechanism for the conveyor 23, so that the mechanisms at the several stations will be actuated in correct sequence. The valve mechanism or unit is indicated at 41, and 42 indicates a group of pipes each of which leads from a valve of the valve unit 41 to the operating mechanism at a corresponding station.

The above is a general description of the sequence of operations of the apparatus, and the several mechanisms provided for effecting these operations will now be individually described.

The loading device indicated at 21 in FIGURE 1, for lifting and tipping a cask on to the conveyor 23 is illustrated in FIGURES 2 and 3 and comprises a lower rectangular frame 45 and an upper rectangular frame 46, both these frames being horizontal and the lower frame 45 resting on the floor. The two frames 45 and 46 are interconnected by crossed levers, that is, at each end of the frame there is a pair of X form levers, the two levers 47 and 48, of each pair being pivotally connected together at 49 where they cross over one another. The lower end of one lever 47 of each pair is pivoted at 50 on the lower frame 45, and the lower end of the other lever 48 of each pair is pivoted on a cross member 51 which extends between opposite ends of the lower frame 45 and is slidable in guides 52 on the opposite ends of the lower frame 45. The upper end of each lever has a trunnion or roller 53 adapted to ride in a guide slot 54 in the corresponding end member of the upper frame 46. A pair of pneumatic rams 55, 56 are connected between the slidable cross member 51 and the lower frame 45 for displacing the cross member 51. With the rams 55 and 56 extended, the cross member 51 will be disposed adjacent to one side, the outer side 57 of the lower frame 45 and the X form levers 47, 48 will be closed and consequently the upper frame 46 will be in its lowered position immediately above the lower frame 45. If the rams 55, 56 are now contracted, the cross member 51 will be displaced towards a position midway between the outer and inner sides of the lower frame, the X form levers 47, 48 will be opened out and the upper frame 46 will be raised.

An upstanding guide 58 is provided for engagement by a trunnion or roller 59 on the upper frame 46 to guide the upper frame during raising and lowering movements. In this particular construction, the upstanding guide 58 is inclined so as to cause the upper frame 46 to move laterally towards the loading station 22 on the cask washing machine of FIGURE 1, as the upper frame 46 is being raised.

A rectangular cask supporting frame 60 is hinged at 61 along one side to the inner side 62 of the upper frame 46 so that it can be swung from a horizontal position to a vertical position. This particular cask supporting frame 60 has notches 63 adapted to accommodate hoops or annular ribs on a cask so as to correctly locate a cask on the supporting frame 60. A pneumatic ram 64 is connected between the upper frame 46 and the cask supporting frame 60 for swinging the latter about its hinge 61 from a horizontal position to a vertical position to tip the cask on to the conveyor 23 of the cask washing machine, the cask being tipped on to one of its ends. It will be understood that the cask supporting frame 60 may be modified for supporting other articles or it may be in the form of a tilting platform.

The pneumatic rams 55, 56 and 64 will of course be connected to a source of air under pressure and control valves will be provided. The ram 64 for tilting the support frame may be controlled by a valve adapted to be opened when the upper frame reaches its raised position. It will also be appreciated that instead of pneumatic rams, any other convenient power means may be provided, for example hydraulic rams, screw mechanism or any convenient mechanical driving means.

The apparatus at the bung unscrewing station is illustrated in FIGURES 4, 5, and 6 and comprises a bung engaging member 70 slidably mounted on a shaft 71 so as to rotate with the shaft and for this purpose the portion of the shaft 71 on which the member 70 is mounted is rectangular in cross-section and the member 70 has a corresponding rectangular hole through which the shaft 71 passes. The member 71 is adapted to engage with a screwed bung, in this particular arrangement the member 70 has two notches 72 at diametrically opposite positions on its periphery as shown in FIGURE 5 for engagement with upstanding lugs on a screw bung. The member 70 is shown in engagement with a screwed bung 73 in FIGURE 4 the upstanding lugs on the bung being indicated at 74 in FIGURES 4 and 6.

The particular kind of screwed bung fitted to the metal casks illustrated in the drawings of the washing apparatus, is known in the trade as a "spear," but nevertheless these spears will be referred to throughout this specification as screwed bungs. Furthermore, it will be appreciated that the invention is not restricted to the particular casks and screwed bungs illustrated, but can equally well be used for washing other types of casks that are fitted with other types of screwed bungs.

This particular spear type of screwed bung 73 incorporates a valve and has a hollow body member which carries the upstanding lugs 74 and is externally screw-threaded for engagement with screw threads 75 in the bung hole in the end wall of a cask 76, the said bung hole being surrounded by a cylindrical upstanding wall 77 on the cask so as to protect the screwed bung. A valve member 78 (see FIGURE 16) within the bung body is urged towards a valve seating 79 by means of a spring 80 and there is a tube 81 which projects from the screwed bung so that when the screwed bung is in position in a cask, the tube 81 projects towards the other end of the cask and the contents of the cask are to be discharged through the said tube. The spear-type screwed bung is of well known construction and forms no part of the present invention.

Returning now to the bung unscrewing mechanism, the square section shaft 71 is driven directly by a pneumatic motor 82 that is mounted on the piston rod 83 of a pneumatic ram for raising and lowering the motor 82 together with the bung engaging member. A dome-headed ferrule 84 is rotatably mounted on the lower end of the shaft 71 for engagement in a central depression in the upper face of the screwed bung so as to correctly locate the bung engaging member 70 relatively to the screwed bung as the bung engaging member is being lowered by the piston rod 83. A locating member 85, comprising a disc larger than the bung-engaging member has a central square hole and a peripheral cylindrical flange, is also slidably mounted on the square shaft 71, immediately behind the bung-engaging member 70 so that the cylindrical flange surrounds and projects slightly beyond the bung engaging member. A helical compression spring 86 is threaded over the square shaft 71 behind the locating member 85 so that one end of the spring engages with the locating member and the other end of the spring bears against a collar 87 secured to the lower end of the ram 82. The spring 86 therefore serves to urge the locating member 85 together with the bung-engaging member 70 towards the ferrule 84 on the leading or free end of the square shaft 71, the ferrule 84 serving as a stop for limiting such movement.

When the unscrewing device is fed by the piston rod 83 to a screwed bung, the locating member 85 will encircle the bung and together with the ferrule 84 will correctly locate the bung-engaging member 70, and the latter will engage with and rotate the bung, assuming that the assembly is being rotated by the pneumatic motor 82. As the device is fed to the bung, the resilient mounting provided by the spring 86 will enable the locating member and the bung-engaging member to retract, and the spring will cause the bung-engaging member 70 to snap into engagement with the lugs 74 of the screwed bung. During the downward movement of the bung unscrewing assembly, the collar 87 engages with the actuating member of a valve 88 that is interposed in the air supply line to the pneumatic motor 82 so as to start the operation of the said motor before the bung engaging member 70 reaches the bung, and the valve will close to stop the motor when the said assembly is retracted. However, the valve 88 may be disposed to be actuated by a member such as the flange 89 that moves axially with the bung engaging member against the action of the spring 86. With this arrangement, as the bung is being unscrewed, it will move upwardly, and will take the bung engaging member 70 with it against the action of the spring 86 and when it has been moved sufficiently for the bung to be disengaged from the bung hole, the flange 89 or equivalent part will be clear of the valve 88 and the latter will be allowed to close so as to stop the motor 82 and so prevent damage to the threads of the screwed bung or the cask bung hole which might occur if the bung was rotated for the whole of the conveyor dwell period.

The bung unscrewing mechanism is disposed at the station 26 and is operative to unscrew the bung of a cask on the conveyor 23 at that station during the dwell period of the step-by-step movement of the conveyor. The unscrewed bung is left in position in the bung hole of the cask, and the cask is then moved to the next station, the bung removing and transferring station 27, by the conveyor 23.

The mechanism for removing an unscrewed bung from a cask and transferring it to the bung conveyor 28 is shown in FIGURE 7. The conveyor 23 in this example is a chain conveyor comprising two parallel endless chains, the top flight of each chain riding along a channel member 90, and in FIGURE 7, a cask 76 is shown in position on the conveyor 23. The channel members 90 are carried by the machine frame 91 which also supports a cross slide 92 above the conveyor 23. A carriage 93 is movable along the cross slide 92 by means of a pneumatic ram 94 to move the carriage between a first position over the centre of the cask 76 and a second position over the bung conveyor 28.

A pneumatic ram 95 is mounted vertically on the carriage 93 and is operatively connected to a slide 96 movable along vertical guides 97 depending from the carriage. A suction device 98 is mounted on the slide 96 and is provided with means for effecting a reduced air pressure at the undersurface of the suction device 98. As most of the various mechanisms of this apparatus are pneumatically operated, it is convenient to supply air under pressure through a flexible pipe (not shown) to a venturi tube arrangement on the suction device 98 for providing the area of reduced pressure. In operation, during the conveyor dwell period whilst a cask 76 at the station 27, the carriage 93 will initially be disposed at the said first position above the centre of the cask 76. The ram 95 will then be operated to lower the suction device 98 on to the screwed bung which at this station is resting freely in the top of the cask bung hole. The suction device is then caused to hold the screwed bung, the ram 95 is retracted to withdraw the screwed bung from the cask, the ram 94 is then actuated to move the carriage 93 to the said second position over the bung conveyor 28, in which position the parts are shown in FIGURE 7. The ram 95 will then be projected to lower the screwed bung on to the bung conveyor, and before retraction of the ram 95, the area of reduced air pressure beneath the suction device will be released by shutting off the air supply to the venturi device mounted thereon.

There is a risk that the leading thread of a screwed bung may become engaged with the leading thread in the bung hole as the screwed bung is resting freely on the bung hole after it has been unscrewed at the station 26 and prior to engagement by the suction device 98 at the station 27. If this should happen, then the suction device may not be able to withdraw the bung from the cask. In order to avoid this, means are provided for partially rotating the cask 76 after the suction device has descended on to the screwed bung. For this purpose, a rotary disc or turntable 99 is mounted beneath the conveyor 23 and disposed with its axis aligned with the cask axis at the station 27. Any convenient means may be provided for projecting the rotary disc 99 into engagement with the cask and for rotating the rotary disc. In this particular example, an endless chain 100 extends around and between a pair of chain wheels 101 and the piston rod 102 of a pneumatic ram 103 is connected to the chain 100 so as to reciprocate the chain and chain wheel device as the ram 103 is operated. The rotary disc 99 is mounted on a spindle that is axially slidable but non-rotatable relatively to one of the chain wheels 101, and a pneumatic ram 104 is provided for displacing the said spindle and so raising and lowering the rotary disc 99. The ram 104 need raise the cask 76 only very slightly so as to relieve the frictional contact of the cask on the conveyor 23. During such partial rotation of the cask, the suction device 98 will hold the screwed bung against rotation with the cask and to ensure that the screwed bung is quite free from the threads in the bung hole.

The bung conveyor 28 is provided with a series of funnel-like members 105 at spaced apart positions along the conveyor 28, which is also an endless chain conveyor. The spacing of the members 105 is such that as the conveyor 28 is driven in step-by-step fashion in synchronism with the conveyor 23, a member 105 will be disposed at each station during the dwell period of the conveyors.

Means are also provided for giving a warning or for automatically stopping the machine in the event that a screwed bung has not been placed on the bung conveyor 28 at the station 27. For this purpose, a light sensitive cell 106 is disposed at one side of the conveyor 23 opposite a light source 107 at the other side of the conveyor and arranged so that the beam of light from 107 to the cell 106 will be interrupted each time a cask passes from the station 27 to the cask inverting station 29. This cell 106 is included in a circuit with a relay 108 that is adapted either to energise a warning device or to stop the machine or both energise the warning device and also stop the machine. A second light source 109 is disposed at one side of the conveyor 28 opposite a second light sensitive cell 109a so that the beam of light from 109 to the cell 109a will be interrupted by screwed bung in position on the conveyor 23 either at the station 27 or immediately the screwed bung is carried away from the station 27 by the conveyor 28. The second cell 109a is also included in the circuit with the relay 108, and the arrangement is such that when the beam from 109 to 109a is interrupted, the relay 108 will be de-energised so that it will not function when the beam from 107 to 106 is next interrupted by a cask moving from the station 27 to the inverting station 29.

When a cask arrives at the inverting station 29, it will be resting on one end with its bung hole uppermost, the screwed bung having been removed at the preceding station 27. It is therefore necessary to invert the cask before it passes to the washing stations 30, 31 and 32. One construction of mechanism for this purpose is illustrated in FIGURES 11 and 12.

A carriage 110 is mounted on rails or guides 111 disposed at one side of the conveyor 23 at the inverting station 29, the rails 111 being at right angles to the conveyor 23, and a pneumatic ram 112 is provided for advancing the carriage 110 along the rails or guides 111 towards the conveyor 23 and for subsequently retracting the carriage 110. A pair of arms 113 are pivotally mounted about vertical axes 114 on the forward end of the carriage 110, that is the end nearest to the conveyor 23, the arms being spaced apart horizontally and projecting forwardly from the carriage. The said arms 113 are interconnected by toggle links 115, the central pivot 116 of which is connected to the piston rod 117 of a pneumatic ram 118 mounted on the carriage 110, the said ram 118 and toggle links 115 being adapted to move the two arms 113 closer together or further apart according to the direction of operation of the ram 118. In this particular construction the two arms are joggled so that their forward portions are sufficiently wide apart to straddle a cask 76.

Each arm 113 has a bearing 119 on its forward end, the axis of the bearing being parallel with the conveyor 23, and a substantially V-shaped member 120, the arms of which subtend an angle substantially in excess of 90 degrees, is pivotally mounted in each bearing 119. The arrangement is such that the V-shaped members 120 face one another, and the axes of the two bearings 119, which are aligned with one another, bisect the angles between the arms of the V-shaped members.

The part of the carriage on which the arms and the pneumatic ram 118 are mounted is itself connected to the carriage by a horizontal pivot 121 at the rear end of the carriage, and a further pneumatic ram 122 is provided for raising the said part, together with the two arms 113, about the pivot 121.

In use, the carriage 110 is retracted to withdraw the arms 113 clear of the conveyor 23. When the conveyor stops with a cask 76 at the inverting station 29, the carriage 110 is advanced so that the arms 113 straddle the cask. The pneumatic ram 118 is then operated to bring the forward ends of the arms 113 closer together so that the V-shaped members 120 engage firmly with opposite sides of the cask. The pneumatic ram 122 is then operated to raise the arms 113, thus raising the cask 76 held between the arms. As the cask is held at positions below its centre of gravity, it will automatically rotate, about the common axis of the bearings 119 in which the V-shaped members 120 are mounted, until it is inverted with the end having the bung hole lowermost. The pneumatic ram 122 is then operated to lower the inverted barrel on to the conveyor 23, whereupon the pneumatic ram 118 is operated to open the arms 113 and the carriage 110 is retracted by the ram 112 to withdraw the arms 113 clear of the cask and the conveyor 23.

This sequence of operations is repeated during each pause of the step-by-step operation of the conveyor 23. Consequently, valve mechanism controlling the pneumatic rams is actuated in timed relationship with step-by-step operation of the conveyor, and may be driven from the conveyor driving mechanism. For example, a member of the driving mechanism that makes one revolution for each step-by-step operation of the conveyor may be arranged to actuate the valve mechanism by driving a cam or the like.

If desired, the arms 113 for inverting a cask can be arranged above the conveyor 23 instead of at one side of the conveyor. It will readily be appreciated that instead of mounting the arms 113 on a carriage movably along horizontal rails or guides, they may be pivotally mounted on a member slidably mounted on vertical guides above the conveyor. Such an arrangement will obviate the need for the pneumatic ram 122, as advance and retraction (in this case downward and upward) movement of the arms can also be arranged to raise and lower a cask. That is, initial downward movement, closing of the arms to grip the cask, raising of the arms sufficiently to enable the cask to rotate to inverted position lowering of the arms to place the inverted cask on the conveyor, opening of the arms and final upward retraction to raise the arms clear of the cask. It is only necessary to arrange the valve mechanism to control the vertical movements so that the arms will be positioned at the several heights.

It will be understood that any other convenient mechanical, hydraulic or electrical mechanism can be employed instead of the pneumatic rams described above.

The apparatus for washing the inverted casks at the washing stations 30, 31 and 32 is shown in FIGURES 13, 14 and 15, and as the apparatus of each of these stations is identical, it is only necessary to describe and illustrate the apparatus of one station. When a cask arrives at a washing station, it is first necessary to centralise the cask so that the cask bung hole will be aligned with a nozzle for supplying washing water to the interior of the cask. Centralising mechanism for this purpose is illustrated in FIGURES 14 and 15. The conveyor 23, which in this example is an endless chain conveyor, has a series of abutments or pushers 122 projecting at spaced apart portions on its upper surface, each pusher 122 being adapted to engage with the rearmost edge of the end of a cask resting on the conveyor so as to ensure that the cask travels with the conveyor. These pushers 122 are arranged so that when the conveyor 23 stops with a cask at the washing station, the bung hole of the cask will be slightly out of register with the nozzle that is, the cask will require to be advanced slightly before the nozzle can be projected through the bung hole.

The cask centering means in this particular example comprises two bell-crank levers each mounted on a horizontal shaft 123 at one side of the conveyor 23, one arm 124 of each lever projecting upwardly and the other arm 125 projecting outwardly and downwardly. The upwardly projecting lever arm 124 has a pair of arms or fingers 126 angularly disposed to one another in V formation and projecting inwardly for engagement with one side of a cask 76 on the conveyor 23. The outwardly and downwardly projecting lever arm 125 is operatively connected to a pneumatic ram 127 which is operable to rock the bell-crank lever so as to move the V-form arms 126 inwardly or outwards relatively to the centre line of the conveyor 23, according to the direction of operation of the pneumatic ram 127. The connection between the bell-crank lever and the pneumatic ram 127 includes damping means such as springs 128. The pneumatic rams 127 at opposite sides of the conveyor 23 are adapted to be actuated in unison, and when they are actuated to move the V-form arms 126 inwardly, the said arms will engage with opposite sides of a cask 76 on the conveyor, and will centralise the cask on the conveyor, and at the same time will displace the cask forwardly away from the conveyor pushers 122 until a vertical plane, at right angles to the direction of conveyor movement and containing the cask axis, bisects the anbles between both pairs of V-form arms or fingers 126. The cask bung hole will then be aligned with the nozzle.

The nozzle mechanism is illustrated in FIGURE 13 in which it will be seen that the nozzle 130 is mounted on the upper end of a vertical pipe which comprises telescopically mounted parts 131 and 132, so that the nozzle can be projected upwardly through the bung hole into the interior of the barrel 76, and subsequently be retracted downwardly. Any convenient mechanism may be provided for projecting and retracting the nozzle. In this particular example, one arm 133 of a two armed lever has a fork 134 which straddles the part 132 of the telescopic pipe with which the fork has a pin 135 and slot 136 engagement. The other arm 137 of the lever is operatively connected to a piston rod 132 of a pneumatic ram 139, so that by controlling the air supply and exhaust of the ram 139 the lever can be rocked about its pivotal mounting 140, thus causing extension or contraction of the pipe 131, 132 according to the direction of operation of the ram 139.

The telescopic pipe is connected by a pipe 141 to a washing water supply pipe in which a control valve 142 is interposed. This control valve 142 is normally closed by means of a spring, but it is operable by means of an externally projecting plunger 143 for opening the valve against the action of the spring. The said plunger 143 is disposed in the path of the arm 137 of the said two armed lever, and arranged so that when the lever reaches the end of its stroke to cause projection of the nozzle 130, the valve 142 will be opened by engagement of the arm 137 with the plunger 143. Similarly as soon as the nozzle 130 commences its retracting movement, the lever arm 137 will move away from the plunger 143 and the valve will be closed by its spring.

The nozzle 130 is rotatably mounted on the upper end of the telescopic pipe 132, and it has jets 144 directed obliquely, so that when the valve 142 is open and washing water is issuing through the nozzle jets 144, the nozzle 130 will be rotated by reaction to the flow of water. The rotating nozzle 130 will therefore direct streams of washing water over the entire internal surface of the cask 76, the water then flowing out through the cask bung hole, which is substantially larger than the diameter of the telescopic pipe and nozzle 130 which projects through the bung hole. Means are provided for preventing the supply of washing water to the nozzle 130 in the event of there being no cask on the conveyor at the washing station. For this purpose, a valve interposed in the air supply line to the ram 139 is operable by a plunger 145 mounted in the angle between one pair of V-form arms or fingers 126 so that the said plunger will be depressed by engagement with a cask 76 when the lever arm 124 is swung inwardly to centralise the cask. However, if there is no cask 76 in position at that time, the plunger 145 will not be depressed and the associated valve will consequently remain closed so as to prevent the supply of air to the ram 139. The result of this will be that the ram 139 will not be operated and the lever 137 will not be depressed and so will not engage with the plunger 143 and consequently the valve 142 will remain closed.

There may be a single washing station or any desired number of washing stations arranged so that a barrel is washed, internally, at each washing station at successive dwell periods of the conveyor. With such an arrangement, the nozzle at each succeeding washing station may be supplied with water at a higher temperature than the nozzle at the preceding station.

Besides the nozzle 130 at each washing station being rotatable, it may be arranged for vertical reciprocation during the washing operation. As stated above, the nozzle 130 has a jet or jets 144 inclined to the axis so as to cause rotation of the nozzle, but the nozzle may also have a jet or jets to direct a stream or streams of water towards the underside of the uppermost end of the cask.

As previously stated, the bung conveyor 28 is driven in step-by-step fashion with the cask conveyor 23, and consequently each screwed bung will be disposed at a bung washing station during the dwell period of the conveyor. In this arrangement there are three bung washing stations 35, 36 and 37 which are aligned with the cask washing stations 30, 31 and 32. The bung washing apparatus which is identical for each of the stations 35, 36 and 37 is illustrated in FIGURE 16. As previously mentioned, the conveyor 28 has a series of funnel-like members 105 to receive the screwed bungs, and one of these members 105 and part of the conveyor 28 are shown in FIGURE 16. The screwed bung is shown with its hollow body resting in the member 105 and its tube 81 projecting downwardly through the opening at the bottom of the funnel-like member 105. A washing head 150 is supported on the lower end of the piston rod 151 of a vertically disposed pneumatic ram for raising and lowering the washing head relatively to a screwed bung supported by the conveyor 28. The washing head is slidable on a spindle 152 secured to a connector member 153 mounted on the lower end of the piston rod 151. The spindle 152 has a head 154 adapted to engage with the valve member 78 of a screwed bung so that when the spindle 152 is moved downwardly by the rod 151, it will displace the valve member 78 from its seating, and the part 155 which carries the valve seat 79 and the tube 81 will also be depressed to displace a sealing ring 156 away from a seating 157 in the hollow body of the bung, the displacement of the part 155 being against the action of a spring 158.

A compression spring 159 is disposed between the washing head 150 and the member 153 so as to permit the spindle 152 to continue its downward movement to open the valve of the bung after the washing head engages with the top of the screwed bung. Consequently, when the rod 151 is in its downward position, the washing head will be engaged with the screwed bung, the valve 78 will be open and the sealing ring 156 will be displaced from the seating 157 so that washing water supplied to the head 150 through the passage 160 can flow through the hollow body of the screwed bung and also through the tube 81. The passage 160 is adapted for connection by means of a flexible pipe to the same water supply as for the nozzle 130 of the cask washing apparatus and is arranged so that washing water will be supplied to the washing head 150 when washing water is supplied to the nozzle 130.

After a cask has passed the final washing station, in this example the station 32, it will be carried by the conveyor 23 to a second cask inverting station 34 where the cask will be re-inverted to bring its end having the bung hole uppermost ready to receive its screwed bung. The inverting mechanism at the station 34 is identical with that described for the station 29.

The cask is then carried to the bung replacing station 39 and the screwed bung will have been carried by the conveyor 28 to the station 38 that is aligned with the station 39. The mechanism for removing the screwed bung from the conveyor at the station 38, transferring it to the station 39 and replacing the bung in the bung hole of the cask is identical with that described for the mechanism at the bung removing station 27, except that the control valves for the supply of air to the pneumatic rams and the suction device are arranged to cause them to operate in the following sequence, which is a reverse of that obtaining at the station 27. First the suction device is lowered to engage with the screwed bung on the conveyor 28, the suction device is caused to hold the screwed bung, and is then raised to lift the screwed bung clear of the conveyor 28. The suction device with the screwed bung depending therefrom is then traversed by its supporting carriage 93 to bring the screwed bung over the cask bung hole, and is then lowered to insert the screwed bung into the bung hole and the suction device then releases the bung.

The cask with its bung in position is then carried by the conveyor 23 to the bung tightening station 40, and the mechanism at this station is identical with that described for the bung unscrewing station 26, but it will be appreciated that the pneumatic motor at the station 26 will rotate in one direction to unscrew the bung, and the motor at the tightening station 40 will rotate in the opposite direction. At the next movement of the conveyor, the cask will be carried to the discharge station 24 from where it will pass on to a conveyor 25 for complete discharge from the washing machine.

As a screwed bung is being raised and lowered at either the bung removing station 27 or at the bung replacing station 39, there is a danger that the tube 81 may swing laterally and so prevent correct insertion into the funnel-like member 105 of the conveyor 28 or into the cask bung hole as the case may be. Means are therefore provided for guiding the said tube 81, and these means are illustrated in FIGURES 9 and 10.

Bearing brackets 165 are mounted on both sides of the vertical guides 97, and two spindles 166 are rotatably mounted between the said brackets. An arm 167 is secured on the central portion of each spindle 166 and a plate or block 168 is secured on the lower end of each arm, each plate or block 168 having a vertical groove for engagement with one side of the tube 81 of a screwed bung. An upstanding arm 169 is secured on the outer end of each spindle, and these two arms 169 are disposed so as to cross one another as shown in FIGURE 10. The weight of the blocks 168 will tend to cause them to swing with their arms 167 towards the tube 81 of a screwed bung carried by the suction device 98, and stops 170 on the guides 97 are engageable by the arms 169 to limit this inward movement of the blocks 168 and arms 167. A block 171 is carried by the slide 96 and is engageable with the crossed arms 169 so that as the slide 96 descends, the block 171 will engage with and rock both arms simultaneously, thus turning the spindles 166 and rocking the arms 167 outwardly to carry the blocks 168 sufficiently far apart to pass over the hollow body member of the screwed bung. When the slide 96 is raised for lifting a screwed bung, the blocks 168 will be permitted to move towards one another and engage with the tube 81 of the screwed bung as to prevent lateral swinging of the tube.

The intermittent or step-by-step movement of the conveyors 23 and 28 is provided in this particular example by means of a Geneva-stop motion, and this is illustrated in FIGURE 17. A driving gear wheel 175 is in mesh with a gear 176 on a shaft 177 on which a disc 178 and arm 179 with laterally projecting boss or roller 180 are mounted. The boss or roller 180 is adapted to enter radially disposed slots 181 in the star wheel 182 of the Geneva-stop motion. The star wheel 182 is mounted on a shaft 183 on which a gear wheel 184 is also mounted and is in mesh with a gear 185 that is mounted on a shaft 186 which is the driving shaft for the conveyors 23 and 28. The shaft 177 also drives a cam-operated valve mechanism indicated at 41 from which the series of pipes, indicated at 42 extend along the length of the machine, each pipe being connected between an individual valve in the mechanism 41 and one of the pneumatic rams on the machine. The cam-operated valve mechanism is of conventional construction and makes one complete revolution for each 90 degrees rotation of the shaft 183. In this way, the several operations at the various stations of the washing apparatus are effected in timed relationship with the step-by-step operation of the conveyors.

The cask inverting mehanism at the stations 29 and 34 and illustrated on FIGURES 11 and 12 is provided with means for limiting the rotation of the cask about the bearings 119. For this purpose, a plate 192 is attached to each V-shaped member so as to rotate therewith, and a stop member 193 is secured on each of the arms 113 in the path of the corresponding plate 192 and so will limit the rotation of the plates 192 and consequently of the V-shaped members 120 and a cask held between the V-shaped members to slightly more than 180 degrees about the bearings 119. It is also desirable to provide means for preventing rebound of the cask when it has been initially inverted, and a trip device is provided for this purpose. This trip device comprises a two armed lever pivotally mounted on a bracket 194 on the machine frame, one arm 195 of this lever projecting downwardly and being weighted and the other arm 196 projecting into the path of the cask during inverting so that the rim of the cask will trip over the arm 196, rocking the two armed lever, but will be prevented from return rotation by reason of engagement of the weighted arm 195 abutting against the outer side of the bracket 194.

It will be appreciated that the apparatus described above and illustrated in the drawings, is by way of example only and is capable of modification within the scope of the invention, For example, instead of employing the suction devices at the stations 27 and 39 for holding the screwed bungs during raising, lowering and transfer, mechanical grippers of any convenient type may be provided.

I claim:

1. Apparatus for washing casks and barrels of the type having bungs which are inserted and removed by rotation, said apparatus comprising a first station, at least one washing station and a final station, conveyor means for transporting casks in succession in step by step fashion through said stations with a dwell period at each said station, means at said first station for rotating said bungs for removal from said casks but leaving said bungs resting in position over the casket bung holes, means between said first station and at least one washing station for removing said bungs from said casks and for concomitantly rotating said casks in a predetermined direction to assure disengagement of said bungs from said casks, washing nozzle means at said at least one washing station and means at said final station for replacing said bungs in said casks.

2. Apparatus for washing casks and barrels as defined in claim 1, comprising a cask inverting station between said first station and said at least one washing station, and a second cask inverting station between said at least one washing station and said final station.

3. Apparatus for washing casks and barrels as defined in claim 1, comprising a second conveyor means parallel with said first conveyor means, bung supporting members on said second conveyor means, a bung receiving station, at least one bung washing station, and a bung delivery station, said second conveyor means extending through said bung receiving, washing and delivery stations, and means driving said second conveyor means with a dwell period when each of said bung supporting members reaches each of said stations.

4. Apparatus for washing casks and barrels as defined in claim 3, comprising a first guide extending between said bung removing station and said bung receiving station, a second guide extending between said bung delivery station and said bung replacing station, a bung engaging device mounted for movement along each of said first and second guides, and means operable for displacing each of said bung engaging devices along said first and second guides respectively.

5. An apparatus for washing casks and barrels of the type having bungs which are inserted and removed by rotation, said apparatus comprising a first station, at least one washing station, and a final station, conveyor means for transporting casks in succession in step-by-step fashion through said stations with a dwell period at each station, means at said first station for rotating said bungs for removal from said casks, washing nozzle means at said at least one washing station, means at said final station for replacing said bungs in said casks, a second conveyor means parallel with said first conveyor means, bung supporting members on said second conveyor means, a bung receiving station, at least one bung washing station, a bung delivery station, said second conveyor means extending through said bung receiving, washing, and delivery stations, means driving said second conveyor means with a dwell period when each of said bung supporting members reaches each of said bung receiving, washing, and delivery stations, a first guide extending between said bung removing station and said bung receiving station, a second guide extending between said bung delivery station and said bung replacing station, a bung engaging device mounted for movement along each of said first and second guides, means operable for displacing each of said bung engaging devices along said first and second guides respectively, and displaceable bung contacting members operatively associated with each of said bung engaging devices, said bung contacting members being operative to centralize a bung relatively to said bung engaging device.

6. Apparatus for washing casks and barrels as defined in claim 1, comprising a nozzle at said at least one washing station, said nozzle being disposed below said conveyor means, mechanism for projecting upwardly said nozzle through a bung hole in a cask on said conveyor means and for retracting said nozzle, and valve means responsive to upward projection of said nozzle for connecting washing water supply to said nozzle when said nozzle is projected upwardly.

7. Apparatus for washing casks and barrels as defined in claim 6, comprising means responsive to the presence of a cask at said washing station, said cask responsive means being operative to permit upward projection of said nozzle when a cask is in position at said washing station.

8. Apparatus for washing casks and barrels as defined in claim 7, comprising means at said washing station engaging with a cask and centering said cask relatively to said nozzle.

9. Apparatus for washing casks and barrels as defined in claim 8, comprising pusher members on said conveyor means, said pusher members engaging with the rear portions of casks on said conveyor means for causing said casks to move with said conveyor means, and said centering means being operative to advance said casks away from said pusher members.

10. Apparatus for washing casks and barrels, according to claim 1, comprising Geneva-stop mechanism incorporated in the driving means for said conveyor for imparting intermittent step-by-step motion to said conveyor.

11. The apparatus defined in claim 1 wherein said bung removing means comprises a suction device operable to axially lift said bungs off their respective casks.

References Cited by the Examiner
UNITED STATES PATENTS

| | | | |
|---|---|---|---|
| 519,021 | 5/94 | Kraft | 81—3.2 |
| 1,171,100 | 2/16 | Dawson | 134—72 X |
| 1,232,175 | 7/17 | Baenninger | 134—72 |
| 1,470,533 | 10/23 | Johnston. | |
| 1,614,042 | 1/27 | Pennock | 53—317 X |
| 1,721,255 | 7/29 | Mitton. | |
| 1,810,511 | 6/31 | Wolfinger | 134—62 |
| 1,820,471 | 8/31 | Luce | 198—29 |
| 1,843,281 | 2/32 | Hoodless | 198—29 |
| 1,914,146 | 6/33 | McClatchie | 134—59 X |
| 1,919,965 | 7/33 | Taylor | 134—48 |
| 1,988,971 | 1/35 | Maynz | 81—3.2 |
| 2,282,474 | 5/42 | Howard | 141—92 X |
| 2,606,707 | 8/52 | Tambini | 53—318 X |
| 2,668,550 | 2/54 | Burge | 134—62 |

CHARLES A. WILLMUTH, *Primary Examiner.*